(12) United States Patent
Mizuno

(10) Patent No.: US 7,944,637 B2
(45) Date of Patent: May 17, 2011

(54) POLARIZING RESIN LENS AND PROCESS FOR PRODUCING SAME

(75) Inventor: Sachiyuki Mizuno, Fukui (JP)

(73) Assignees: Yugengaisha Magtec, Fukui (JP); Mari Vision Inc., Osaka (JP)

( * ) Notice: Subject to any disclaimer, the term of this patent is extended or adjusted under 35 U.S.C. 154(b) by 789 days.

(21) Appl. No.: 11/664,002

(22) PCT Filed: Sep. 28, 2004

(86) PCT No.: PCT/JP2004/014168
§ 371 (c)(1),
(2), (4) Date: Jul. 6, 2007

(87) PCT Pub. No.: WO2006/035494
PCT Pub. Date: Apr. 6, 2006

(65) Prior Publication Data
US 2008/0094702 A1 Apr. 24, 2008

(51) Int. Cl.
*G02B 5/30* (2006.01)
*B29B 11/00* (2006.01)
(52) U.S. Cl. .......... 359/900; 359/352; 264/2.7; 351/163
(58) Field of Classification Search .................. 359/350, 359/352, 483–502, 642, 900
See application file for complete search history.

(56) References Cited

U.S. PATENT DOCUMENTS

| | | | | |
|---|---|---|---|---|
| 2,263,249 A * | 11/1941 | Rogers | ............................ | 359/490 |
| 3,940,304 A * | 2/1976 | Schuler | ......................... | 156/245 |
| 5,232,637 A * | 8/1993 | Dasher et al. | .................. | 264/1.32 |
| 5,412,505 A | 5/1995 | van Ligten et al. | | |
| 5,702,813 A * | 12/1997 | Murata et al. | .................. | 428/332 |
| 5,926,310 A | 7/1999 | Tamura et al. | | |
| 6,585,373 B2 * | 7/2003 | Evans et al. | .................... | 351/163 |
| 6,613,433 B2 * | 9/2003 | Yamamoto et al. | ......... | 428/411.1 |
| 6,650,473 B2 * | 11/2003 | Nakagoshi | ..................... | 359/490 |
| 2001/0028436 A1 * | 10/2001 | Evans et al. | .................... | 351/163 |
| 2003/0179459 A1 * | 9/2003 | Hayashi | ........................ | 359/642 |

FOREIGN PATENT DOCUMENTS

| | | |
|---|---|---|
| JP | 53-125051 | 11/1978 |
| JP | 63-21605 | 1/1988 |
| JP | 9-258009 | 10/1997 |
| JP | 10-133016 | 5/1998 |
| JP | 2001-350122 | 12/2001 |

OTHER PUBLICATIONS

English translation of Chinese Office Action dated Feb. 13, 2009 issued in Chinese Application No. 2004800440966 corresponding to the present application.
English translation of Notification of Reason for Refusal dated May 6, 2010 in the Japanese application corresponding to the present US application.

* cited by examiner

*Primary Examiner* — Thong Nguyen
(74) *Attorney, Agent, or Firm* — Wenderoth, Lind & Ponack, L.L.P.

(57) ABSTRACT

A UV adhesive is applied on the rear surface of a polarizing film molding 4 to form a UV adhesive layer 3. The front surface of a lens base 2 is laid on the UV adhesive layer 3 and is glued by UV irradiation to form a laminated lens substrate 5. On the polarizing film molding 4 of the laminated lens substrate 5 is formed a curing resin monomer layer 6, which is cured to integrate the curing resin monomer layer 6 with the laminated lens substrate 5.

4 Claims, 3 Drawing Sheets

(a)

(b)

POLARIZING RESIN LENS AND PROCESS FOR PRODUCING SAME

BACKGROUND OF THE INVENTION

The present invention relates to a polarizing resin lens with a polarizing film bonded hardly, having continuous anti-glare property and excellent productivity and also relates to a method for manufacturing the same.

Conventionally, there has been known a polarizing resin lens and a method for manufacturing the same, the polarizing resin lens being constructed by bonding a polarizing film on the surface of a lens made of thermoplastic resin or thermosetting resin (Japanese Laid-open Patent Publication No. H10-133016 (paragraph 0029, FIG. 2)). That is, as the conventional method for manufacturing the polarizing resin lens, there have been two methods. In one method a polarizing film is sandwiched between two lenses to bond using an adhesive; in the other method a polarizing film is inserted into an injection-molding die to injection mold thermoplastic resin without using an adhesive.

SUMMARY OF THE INVENTION

In the above method using an adhesive, there have been problems that the polarizing film is shifted from a predetermined position or creased when bonding and that the lenses are strained due to a pressure when sandwiching the polarizing film between two lenses. In the above method by the injection molding, there has been a problem that the polarizing film is deformed or corrugated when injecting resin. In either method, there have been problems of low yield, bad productivity and high cost.

In view of the above problems, it is an object of the present invention to provide a polarizing resin lens with a polarizing film bonded hardly, having continuous anti-glare property and excellent productivity and also relates to a method for manufacturing the same.

In order to solve the above problems, a polarizing resin lens according to the present invention comprises:

a polarizing film molding;

a UV adhesive layer applied on the rear surface of the polarizing film molding;

a lens base superimposed on the UV adhesive layer and bonded by a UV irradiation; and a curing resin monomer layer formed on the front surface of the polarizing film molding.

The curing resin monomer layer is a concept including a thermosetting resin monomer layer, a UV-thermosetting resin monomer layer using UV (ultraviolet) and an EB-setting resin monomer layer using EB (electron beam).

The polarizing film molding may be formed by applying a primer on the front and rear surfaces thereof and drying.

A method for manufacturing a polarizing resin lens according to the present invention comprises steps of:

preparing a lens base and a polarizing film molding;

applying a UV adhesive on the rear surface of the polarizing film molding to form a UV adhesive layer;

superimposing the front surface of the lens base on the UV adhesive layer and bonding by a UV irradiation to form a laminated lens substrate;

forming a curing resin monomer layer on the polarizing film molding of the UV adhesive layer; and curing the curing resin monomer layer to bond and integrate the curing resin monomer layer and the laminated lens substrate.

Before the step of forming the UV adhesive layer, the method may further comprise a step of forming the polarizing film molding so as to fit with the front surface of the lens base.

Before the step of forming the UV adhesive layer, the method may further comprise a step of applying a primer on the front and rear surfaces of the polarizing film molding and drying.

The step of forming the UV adhesive layer may be conducted by mounting the front surface of the polarizing film molding on a molding die.

The step of forming the curing resin monomer layer may include:

filling a curing resin monomer on a molding die; and mounting the laminated lens substrate on the curing resin monomer to superimpose the polarizing film molding of the laminated lens substrate on the curing resin monomer.

The method may further comprise:

trimming the outer periphery of the polarizing film molding of the laminated lens substrate around the UV adhesive layer got out of the lens base to leave a projecting portion; and when mounting the laminated lens substrate on a molding die, laying the projecting portion of the laminated lens substrate on a step portion formed on the inner circumference of a frame of the molding die to hold a distance between the concave surface of the molding die and the polarizing film molding of the laminated lens substrate.

According to the present invention, a UV adhesive is applied on the rear surface of the polarizing film molding to form a UV adhesive layer; the front surface of the lens base is superimposed on the UV adhesive layer and bonded by a UV irradiation to form a laminated lens substrate; a curing resin monomer layer is formed on the polarizing film molding of the UV adhesive layer; and the curing resin monomer layer is cured to bond and integrate the curing resin monomer layer and the laminated lens substrate. Therefore, a situation that the polarizing film is shifted from a predetermined position or creased is not caused and the lens base and the polarizing film molding are completely bonded. Also, a no-strain and stable state is continued for a long time and anti-glare property is not deteriorated.

In addition, the outer periphery of the polarizing film molding of the laminated lens substrate is trimmed around the UV adhesive layer got out of the lens base to leave a projecting portion; and when mounting the laminated lens substrate on a molding die, laying the projecting portion of the laminated lens substrate is lied on a step portion formed on the inner circumference of a frame of the molding die to hold a distance between the concave surface of the molding die and the polarizing film molding of the laminated lens substrate. Therefore, the lens base does not necessitate enlarging the diameter, enabling to use a ready-made, enhancing yield remarkably, increasing productivity, and decreasing fabrication cost.

In addition, since the thermosetting resin monomer layer functions as a thin lens for covering the front surface portion of the laminated lens substrate, enabling to attain perfect bonding and making it difficult to scratch. It is also possible to endure a long term use and maintain anti-glare property.

DETAILED DESCRIPTION OF THE PREFERRED EMBODIMENTS

Figure 1:
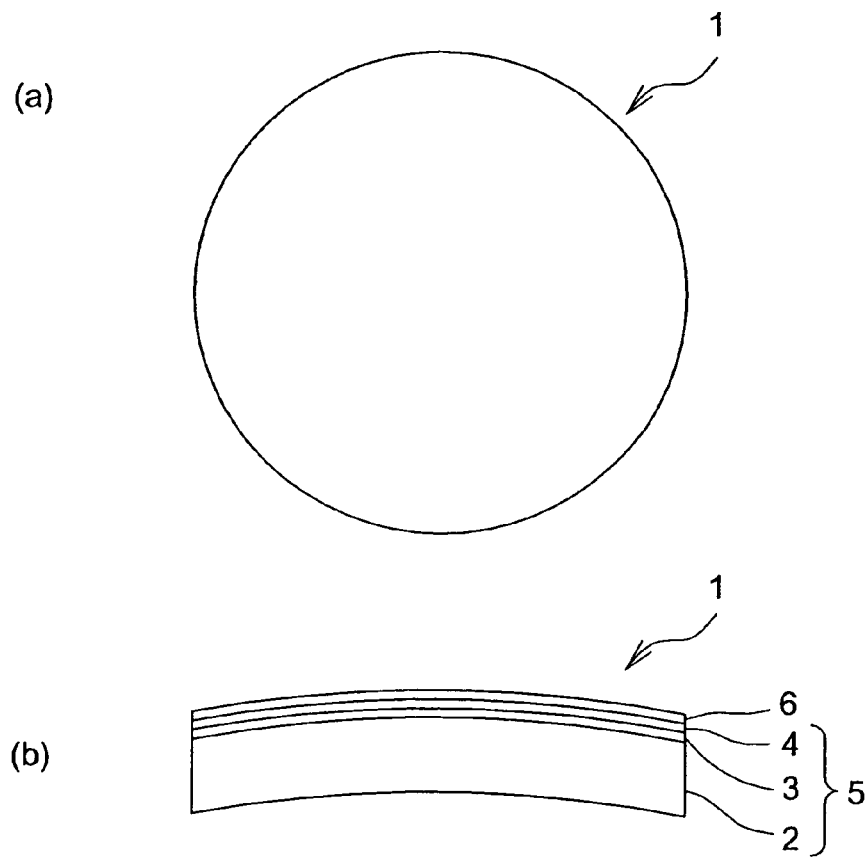
FIG. 1 (a) is a front view of a polarizing resin lens, (b) is a central cross sectional view of the polarizing resin lens.
Figure 2:
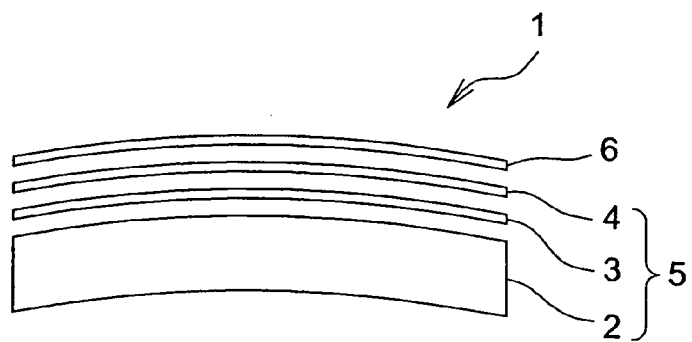
FIG. 2 is an illustration showing an exploded state of the polarizing resin lens.

Hereinafter, embodiments of a polarizing resin lens and a method for manufacturing the same according to the present invention will be described.

A polarizing resin lens 1 is comprises of a lens base 2, a polarizing film molding 4 and a thermosetting resin monomer layer 6.

The lens base 2 is transparent or semitransparent and is molded from a resin such as thermosetting resin, thermoplastic resin or the like by a casting method, an injection molding method and so on. The lens base 2 presents a circular shape having a thickness of 1.5 mm-20 mm and a diameter of 50 mm-100 mm. The front surface of the lens base 2 has a convex shape and the rear surface has a concave shape. The lens base 2 may have a middle refractive index of 1.53-1.58 or a high refractive index of 1.59-1.80 and as well as a normal refractive index of 1.50.

The polarizing film molding 4 is fabricated by sandwiching a thin film, which comprises a thin film having a thickness of 30/1000-35/1000 mm and is made of polyvinyl alcohol (PVA), polycarbonate (PC) or polyacrylate (PA), between two molding dies, heating and pressing to provide a curved surface fitting the front surface of the lens base 2, and removing from the molding dies after cooling. A plurality of the polarizing film moldings 4 is prepared so that the front and rear surfaces of each of the polarizing film moldings 4 are applied with primer and dried. The molding dies of the polarizing film molding 4 are preferably made of glass or metal.

The rear surface of the polarizing film molding 4 is formed with a UV adhesive layer 3 on which the front surface of the lens base 2 is superimposed and bonded.

The thermosetting resin monomer layer 6 is formed on the front surface of the polarizing film molding 4. As a thermosetting resin monomer, CR-39 (acrylic-diglycolcarbonate) and TS-16 (diethylenbisalylcarbonate) are preferable but are not limited to those. The thermosetting resin monomer layer 6 functions as a thin lens for covering the front surface portion of a laminated lens substrate 5. The thermosetting resin monomer layer 6 may have a middle refractive index of 1.53-1.58 or a high refractive index of 1.59-1.80 and as well as a normal refractive index of 1.50. In stead of the thermosetting resin monomer layer 6, UV-setting resin monomer layer using UV (ultraviolet) and EB-setting resin monomer layer using EB (electron beam) can be used. The front surface of the thermosetting resin monomer layer 6 may have any shape of such as spherical, aspheric, progressive multifocal, bifocal, special multifocal, trifocal and so on.

Next, the method for manufacturing polarizing resin lens 1 will be described.

The lens base 2 and the polarizing film molding 4 are prepared first. The front and rear surfaces of the lens base 2 have convex and concave shapes respectively and are formed with spherical surfaces having predetermined curvatures respectively. As the lens base 2, an unpolished ready-made lens having a standard dimension of diameter of 50 mm-100 mm or a polished lens as such can be used. The polarizing film molding 4 has a larger circular shape than the lens base 2 and is preformed so as to abut against the front surface of the lens base 2. The front and rear surfaces of the polarizing film molding 4 are applied with primer and dried.

Figure 3:
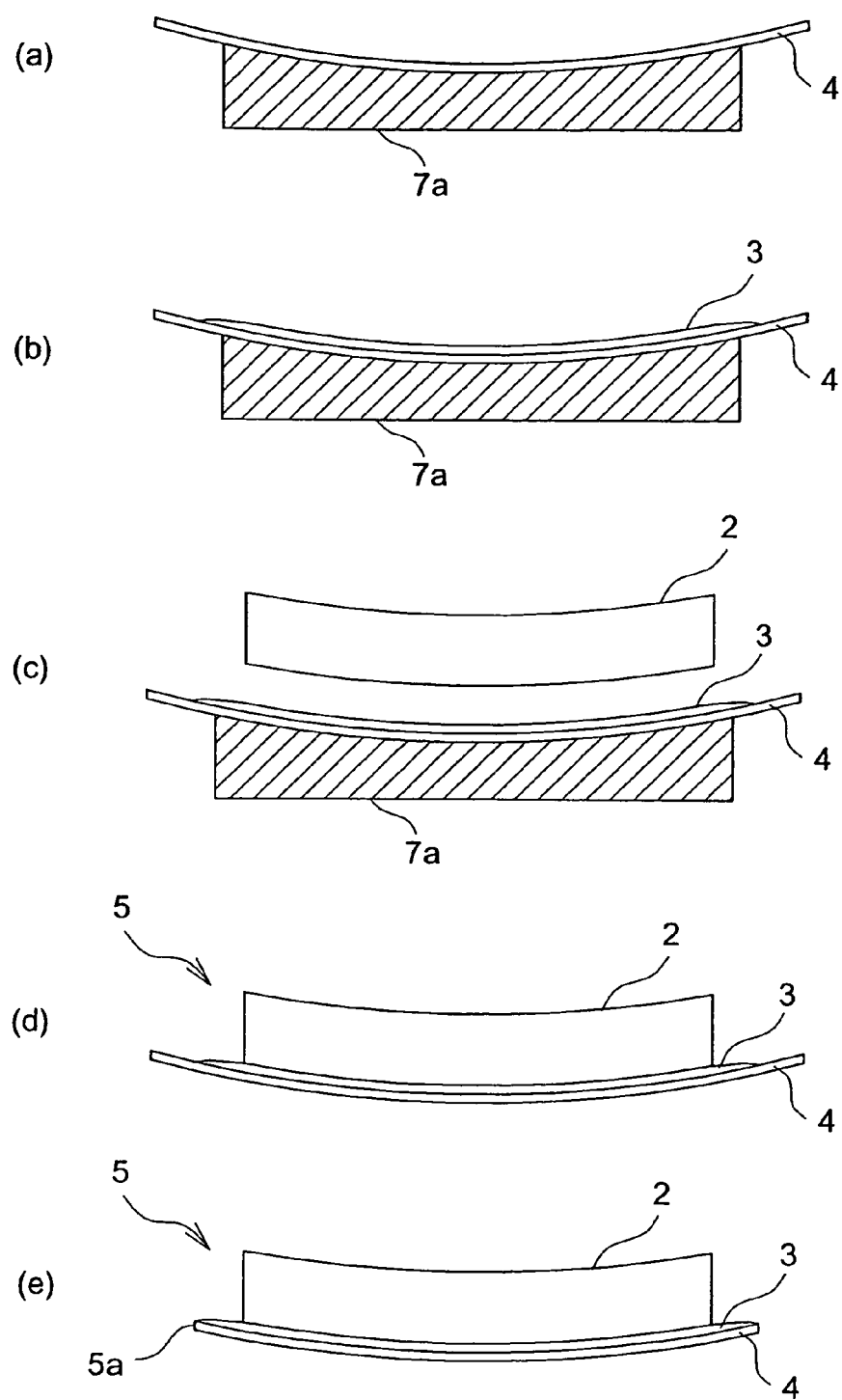
FIG. 3 is a central cross sectional view of the polarizing resin lens showing a fabricating process in order.

Then, as shown in FIG. 3(*a*), on a molding die 7*a* having a concave surface corresponding to the front surface of the lens base 2, the polarizing film molding 4 is rested with the front surface thereof superimposed. Subsequently, as shown in FIG. 3(*b*), a suitable amount of UV adhesive is applied on the rear surface (the upper surface in the figure) of the polarizing film molding 4 to form a uniform UV adhesive layer 3. On the UV adhesive layer 3, as shown in FIG. 3(*c*), the front surface of the lens base 2 is superimposed. Both of the molding die 7*a* and the lens base 2 are pressed for a short time to temporarily bond the polarizing film molding 4 on the front surface of the lens base 2. At this point, as shown in FIG. 3(*c*), the outer periphery of the UV adhesive layer 3 is adapted to got out of the outer circumference of the lens base 2. The lens base 2 and the polarizing film molding 4 are introduced into a UV irradiation unit (not shown) as bonded condition without releasing from the molding die 7*a* to irradiate UV for 10-120 seconds from upper side of the molding die 7*a*. Thus, a semimanufactured laminated lens substrate 5 which is primarily bonded is obtained. As shown in FIG. 3(*d*), the laminated lens substrate 5 is once released from the molding die 7*a*.

As shown in FIG. 3(*e*), the outer periphery of the polarizing film molding 4 of the laminated lens substrate 5 is trimmed around the UV adhesive layer 3 to leave a projecting portion 5*a*. If the diameter of the lens base 2 is 75 mm, then the outer diameter of the projecting portion 5*a* is about 78 mm.

Figure 4:
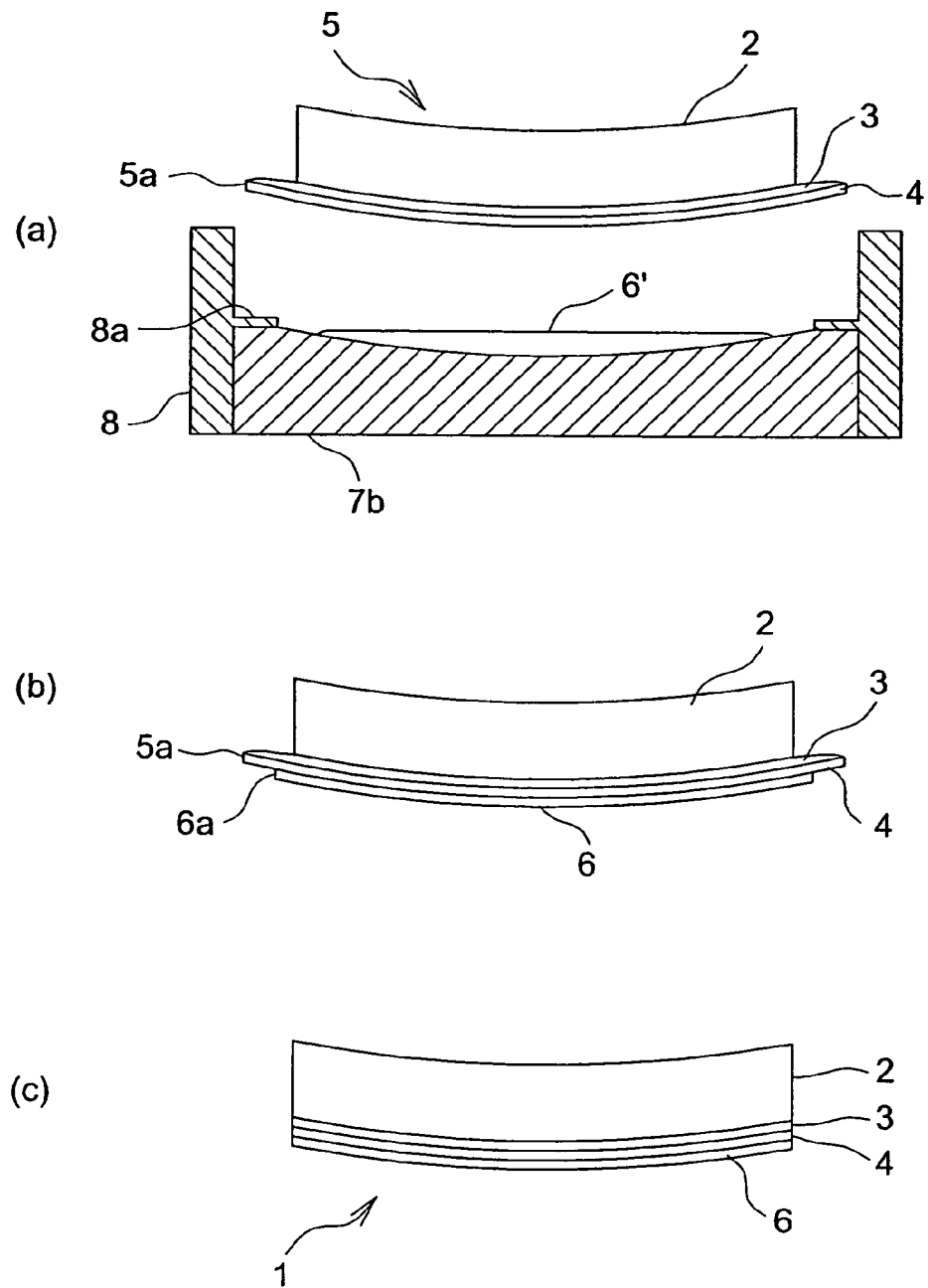
FIG. 4 is a central cross sectional view showing a fabricating process continued from FIG. 3.

Subsequently, as shown in FIG. 4(*a*), the concave surface of the molding die 7*b* is filled with a suitable amount of thermosetting resin monomer 6' on which the laminated lens substrate 5 is mounted. At this point, the projecting portion 5*a* of the laminated lens substrate 5 is laid on a step portion 8*a* formed on the inner circumference of a frame 8 of a molding die 7*b* to hold a distance between the concave surface of the molding die 7*b* and the polarizing film molding 4 of the laminated lens substrate 5. The concave surface of the molding die 7*b* may have any shape of such as spherical, aspheric, progressive multifocal, bifocal, special multifocal, trifocal and so on. The laminated lens substrate 5 is introduced into a constant-temperature oven (not shown) within a non-oxidation ambience as set condition on the thermosetting resin monomer 6' without releasing from the molding die 7*b* to hold for 8-20 hours at a temperature of 5-135° C., generally 35-90° C., allowing the thermosetting resin monomer 6' to polymerize and harden to form the thermosetting resin monomer layer 6. As shown in FIG. 4(*b*), when the laminated lens substrate 5 with the thermosetting resin monomer layer 6 formed is released from the molding die 7*b* to cut a surplus portion 6*a* and the projecting portion 5*a* of the thermosetting resin monomer layer 6, the polarizing resin lens 1 as shown in FIG. 4(*c*) is obtained. If a UV-setting resin monomer layer or a EB-setting resin monomer is used, UV (ultraviolet) or EB (electron beam) may be irradiated from the upper side of the laminated lens substrate 5.

Since the laminated lens substrate 5 is supported by mounting the projecting portion 5*a* formed on the outer periphery of the laminated lens substrate 5 onto the step portion 8*a* of the frame 8 of the molding die 7*b*, the lens base 2 does not necessitate enlarging the diameter, enabling to use a ready-made.

Since the constant-temperature oven within a non-oxidation ambience is filled with an inert gas such as nitrogen gas, thermal polymerization in a non-oxidation ambience is carried out, further enhancing polymerizing and curing action.

As the obtained polarizing resin lens 1 has a polarization degree of more than 90% that is almost same level as the conventional polarizing lens, it goes without saying that glare of reflected light can be perfectly prevented.

The polarizing resin lens 1 of the present invention is mainly used as sunglasses, though it goes without saying that a glass may be with degree or without degree.

What is claimed is:

1. A method for manufacturing a polarizing resin lens, comprising steps of:

preparing a lens base and a polarizing film molding;

applying an ultraviolet adhesive on the rear surface of the polarizing film molding to form an ultraviolet adhesive layer;

superimposing the front surface of the lens base on the ultraviolet adhesive layer and bonding by an ultraviolet irradiation to form a laminated lens substrate;

filling a curing resin monomer on a molding die;

mounting the laminated lens substrate on the curing resin monomer to superimpose the polarizing film molding of the laminated lens substrate on the curing resin monomer to form a curing resin monomer layer on the polarizing film molding of the laminated lens substrate; and curing the curing resin monomer layer to bond and integrate the curing resin monomer layer and the laminated lens substrate;

further comprising steps of:

trimming the outer periphery of the polarizing film molding of the laminated lens substrate around the ultraviolet adhesive layer got out of the lens base to leave a projecting portion; and when mounting the laminated lens substrate on the molding die, laying the projecting portion of the laminated lens substrate on a step portion formed on the inner circumference of a frame of the molding die to hold a distance between a concave surface of the molding die and the polarizing film molding of the laminated lens substrate.

2. The method as in claim 1, further comprising, before the step of forming the ultraviolet adhesive layer, a step of forming the polarizing film molding so as to fit with the front surface of the lens base.

3. The method as in claim 1, further comprising, before the step of forming the ultraviolet adhesive layer, a step of applying a primer on the front and rear surfaces of the polarizing film molding and drying.

4. The method as in claim 1, wherein in the step of applying the ultraviolet adhesive, the front surface of the polarizing film molding is mounted on a molding die.

\* \* \* \* \*